(12) United States Patent
Rubtsov

(10) Patent No.: US 7,341,416 B1
(45) Date of Patent: Mar. 11, 2008

(54) MACHINE AND METHOD TO FEED FILLED BAGS, OPEN THE BAGS, EMPTY THE BAGS, AND DISPOSE OF THE EMPTY BAGS

(76) Inventor: Yuriy N. Rubtsov, 6026 S. Ukraine St., Aurora, CO (US) 80015

( * ) Notice: Subject to any disclaimer, the term of this patent is extended or adjusted under 35 U.S.C. 154(b) by 120 days.

(21) Appl. No.: 11/316,486

(22) Filed: Dec. 21, 2005

Related U.S. Application Data

(60) Provisional application No. 60/640,743, filed on Dec. 30, 2004.

(51) Int. Cl.
*B65G 65/30* (2006.01)
(52) U.S. Cl. .................................................. 414/412
(58) Field of Classification Search ................ 414/412, 414/411, 769.4, 797.3, 797.4
See application file for complete search history.

(56) References Cited

U.S. PATENT DOCUMENTS

| | | | |
|---|---|---|---|
| 654,509 A | 7/1900 | Bonbam .................... 406/70 |
| 3,306,674 A | 2/1967 | Diehm ....................... 302/37 |
| 3,995,775 A | 12/1976 | Birkmeier et al. .......... 222/193 |
| 4,129,338 A | 12/1978 | Mudgett ..................... 302/2 |
| 4,252,484 A * | 2/1981 | Benson et al. ............ 414/795.6 |
| 4,411,390 A | 10/1983 | Woten ........................ 241/98 |
| 4,798,508 A * | 1/1989 | Lewis ........................ 414/412 |
| 4,843,801 A | 7/1989 | Roncero ..................... 53/492 |
| 4,929,141 A | 5/1990 | Keesey et al. .............. 414/412 |
| 5,156,499 A | 10/1992 | Miklich ...................... 406/70 |
| 5,237,910 A * | 8/1993 | Chigira ...................... 99/282 |
| 5,454,683 A * | 10/1995 | Marom et al. .............. 414/412 |
| 5,511,730 A | 4/1996 | Miller et al. ................ 241/57 |
| 5,556,237 A | 9/1996 | Rexius ........................ 406/32 |
| 5,590,984 A * | 1/1997 | Assarsson ................... 406/32 |
| 5,639,033 A | 6/1997 | Miller et al. ................ 241/57 |
| 5,683,810 A | 11/1997 | Babbitt et al. .............. 428/370 |
| 5,758,362 A * | 6/1998 | Focke et al. ................. 53/492 |
| 5,788,163 A | 8/1998 | Woten et al. ............... 239/654 |
| 5,813,199 A | 9/1998 | Temburg ..................... 53/492 |
| 6,079,929 A | 6/2000 | Muma et al. ............... 414/412 |
| 6,088,968 A * | 7/2000 | Williston et al. ............ 52/64 |
| 6,089,814 A * | 7/2000 | Bayer ......................... 414/412 |
| 6,241,097 B1 * | 6/2001 | Roman ........................ 209/3 |
| 6,503,026 B1 | 1/2003 | Mitchell .................... 406/128 |
| 6,659,377 B1 | 12/2003 | Coulter et al. ............. 241/60 |
| 6,725,631 B2 | 4/2004 | Skrak et al. ................ 53/492 |
| 6,732,960 B2 | 5/2004 | Shaw et al. ............... 239/690 |
| 2004/0055438 A1 * | 3/2004 | Ours et al. .................. 83/861 |

FOREIGN PATENT DOCUMENTS

JP 402045327 A 2/1990 ................ 53/381.2

* cited by examiner

*Primary Examiner*—Saul Rodriguez
*Assistant Examiner*—Joshua I Rudawitz
(74) *Attorney, Agent, or Firm*—Rick Martin; Patent Law Offices of Rick Martin, P.C

(57) ABSTRACT

A filled plastic bag may contain insulation. The bags are stacked in a loader. A pair of reciprocating arms rotate a bottom-most bag causing that bag to fall through an opening of a base. A conveyor receives the bag and moves it through a transverse knife and a longitudinal knife. Once the bottom of the bag is slit into quadrants, a pair of gripper wheels peel the bag off. The bag's contents fall into a hopper of a blower.

15 Claims, 6 Drawing Sheets

MACHINE AND METHOD TO FEED FILLED BAGS, OPEN THE BAGS, EMPTY THE BAGS, AND DISPOSE OF THE EMPTY BAGS

CROSS REFERENCE APPLICATIONS

This application is a non-provisional application claiming the benefits of provisional application No. 60/640,743 filed Dec. 30, 2004.

FIELD

The present invention relates especially to opening insulation bags and feeding insulation to a blower for application to buildings.

BACKGROUND

Insulation blowing and spraying machines are well known in the art. U.S. Pat. No. 4,411,390 (1983) to Woten discloses a blower having a receiving hopper, a shedding zone, an auger, and a tearing and separating zone. A fan propels the particulate insulation material down a hose, usually for application in a building.

U.S. Pat. No. 4,798,508 (1989) to Lewis discloses a bag of asbestos which is opened by machine, emptied, and the bag is disposed of. Bags are fed vertically down into two rotating drums each having rigid spikes to separate two halves of the bag after a knife cuts open the bag down the middle. The spikes could injure a worker. The bag segments fall away into an undisclosed place.

U.S. Pat. No. 5,590,984 (1997) to Assarsson discloses a truck that has a ceiling mounted conveyor and a system which first cuts open insulation bags, then drops the insulation into a hopper of a blower. The system requires the set up labor of inserting a carrier rod through each bag and lifting, then hooking each bag to the ceiling conveyor.

The present invention simplifies the operation of a portable insulation bag handling, opening and blower system. Various sized bags can be handled. Standard bags are stacked in a loading bin. The one man operator can remotely feed a bag onto a horizontal conveyor which cuts open and strips off and discards the bag. The bag then drops into a conventional blower. The operator can be stationed inside a building under construction applying insulation while all these processes occur.

SUMMARY OF THE INVENTION

An aspect of the present invention is to provide a gravity feed loader for bags filled with insulation or any bulk material.

Another aspect of the present invention is to provide a horizontal conveyor system with a stationary slitter knife and a transverse slitter knife to open plastic bags.

Another aspect of the present invention is to provide a pair of gripper wheels to peel off the slit bags and discharge them into a bin.

Another aspect of the present invention is to have the conveyor system dump the bag contents into an intake hopper of a blower.

Another aspect of the present invention is to design the entire system to be operable by a single operator, wherein the system is truck mounted.

Other aspects of this invention will appear from the following description and appended claims, reference being made to the accompanying drawings forming a part of this specification wherein like reference characters designate corresponding parts in the several views.

The vertical stacker allows several (insulation) filled bags to be stacked onto a base plate that has a rectangular opening. The bags are stacked cross grain to the rectangular opening for passive storage. In the feed step, a pair of robot arms rotates the bottom bag to align with the rectangular opening, and the bag falls onto the conveyor. The next bag is rotated in the opposite direction, and the process continues until the vertical stacker is depleted.

Once on the conveyor, the bag moves atop free rollers. Powered wheels above the bag move the bag forward. First a transverse moving knife slits the bottom of the bag into quadrants. Then a stationary bottom centrally located knife slits the bag longitudinally. Toward the end of the conveyor, a pair of gripper wheels peel the bag off from the top of the bag and discard it into a bin. Next the contents of the bag fall into a prior art intake hopper of a blower (for insulation in the preferred embodiment).

It is to be understood that the term conveyor may include any apparatus for moving bags. Although the disclosed embodiments comprise conveyor systems of moving rollers and/or powered wheels, other types of conveyor systems could be used. Examples of other types of conveyor systems include, but are not limited to, moving belts and moving chains.

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION OF THE DRAWINGS

Figure 1:
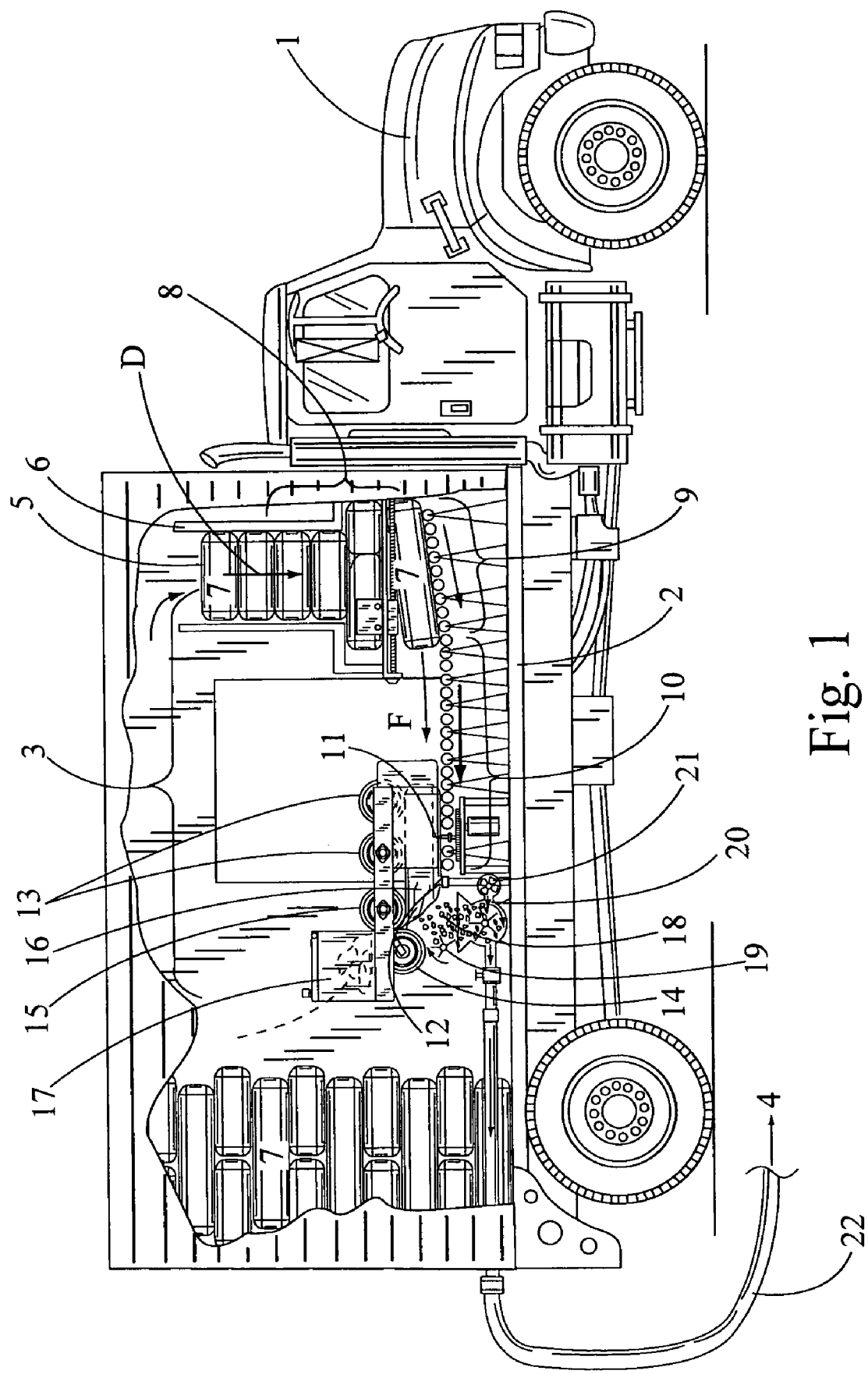
FIG. 1 is a side elevation view of a truck which is cut away to show a portable bag loader and conveyor/opener system.

Referring first to FIG. 1, a truck 1 has a bed 2 on which is mounted a bag loader and conveyor/opener system 3. An operator (not shown) controls the insulation discharge as needed. Prior art remote controls start and stop the system 3. Before starting a project, the operator stacks filled bags 7 into stack 5. The guides 6 hold the stack 5 in a vertical column as shown. Gravity asserts force on stack 5 in direction D. When a bag (preferably of insulation) is needed, the operator triggers loader 8 to drop a filled bag 7 onto a sloped, first stage, free rolling conveyor 9 which gravity feeds to a horizontal second stage, free rolling conveyor 10.

Powered wheels 13 drive the bag 7 in direction feed F. Knives 11, 12 slit the plastic bag open.

The plastic bag 16 is removed from the contents by the gripper wheels 14, 15. The plastic bag 16 is discarded into bin 17. The bag contents 18 are fed into thrasher 19 and then into rotary airlock 20 of blower system 21. The operator controls the hose 22 and discharge 4 as needed.

Figure 2:
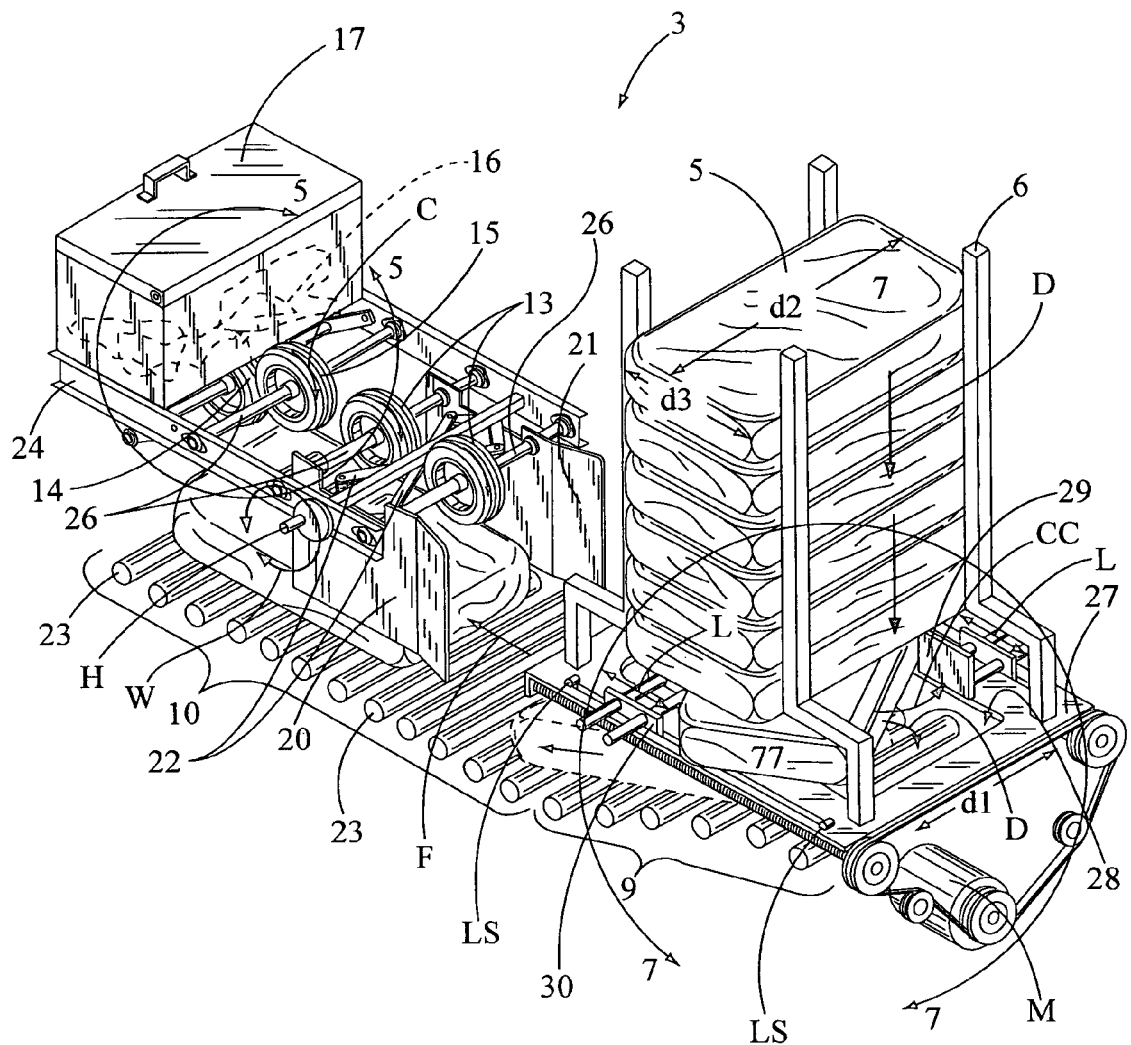
FIG. 2 is a top perspective view of the bag loader and conveyor/opener system.

Referring next to FIG. 2, the loader base 27 has a longitudinally oriented rectangular opening 28 sized to pass a bag 7 therethrough. In the passive loaded mode, the length d2 of the bags 7 is greater than the width d1 of the opening 28, thus, the bags rest across the opening 28. Width d1 is always larger than bag width d3.

In the loading of the conveyor 9 operation, the arms 29, 30 move in opposite directions to one another shown by arrows load L. The arms 29, 30 are shown rotating the bag 77 in a counterclockwise direction shown by arrow CC. When the bag 77 aligns with opening 28, it falls in direction down D onto conveyor segment 9. Limit switches LS act to stop the arms 29, 30 and reverse the direction of motor M, thereby rotating the next bag in a clockwise direction. The loading process continues alternating the rotation of the lowermost bag until the stack 5 is depleted.

The system 3 handles various width d3 bags by adjusting the guides 6 and turning handle H. Handle H opens and closes scissor assembly 22 which controls the movement of panels 20, 21 to fit the bag width d3. Handle H moves in directions width W shown by arrows W.

Axles 26 are powered, thus rotating drive wheels 13 and 15 clockwise as shown by arrow C. The last gripper wheel 14 turns counterclockwise. A frame 24 supports the axle and drive means.

Figure 3:
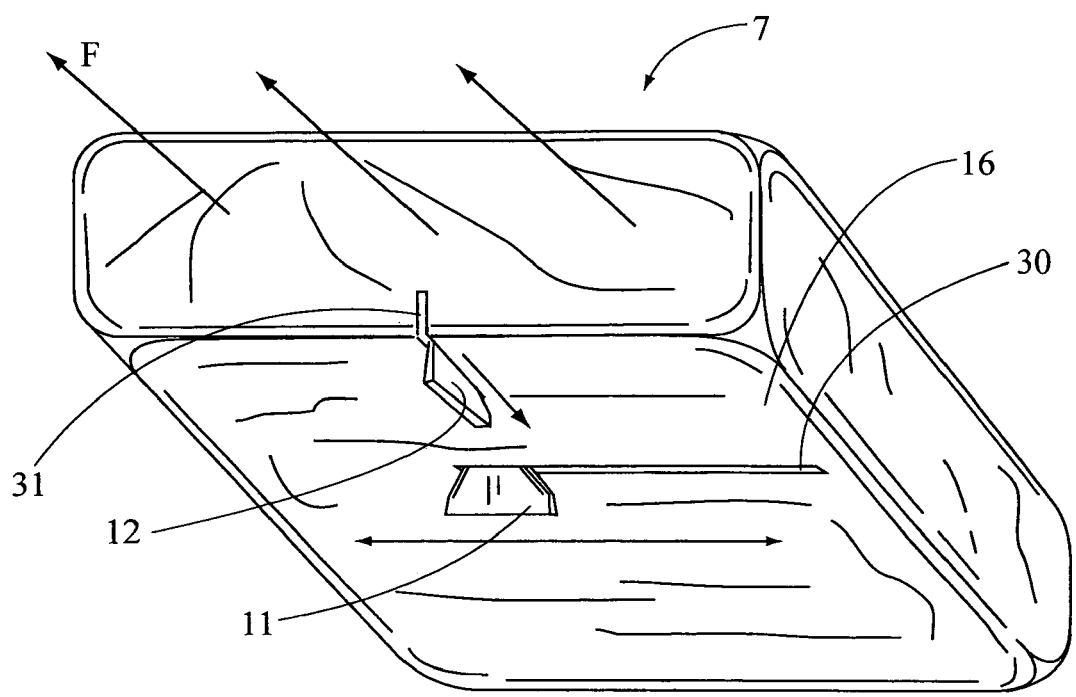
FIG. 3 is a bottom perspective view of both the stationary blade and moving transverse slitter blade at work.
Figure 4:
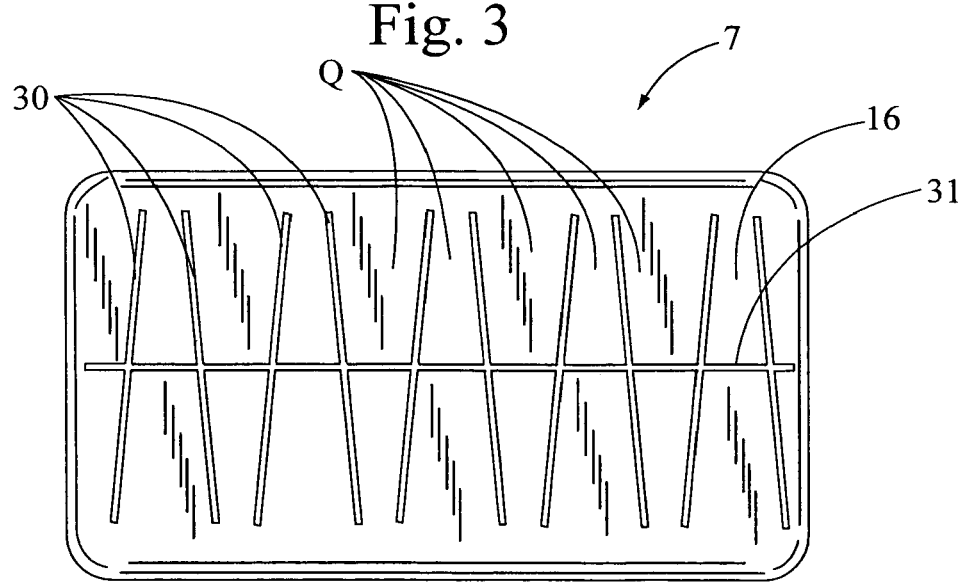
FIG. 4 is a bottom plan view of the slit bag just before the gripper wheels strip the bag from the contents (insulation).

Referring next to FIGS. 3, 4, a stationary knife 12 creates a longitudinal slit 31. The bag 7 moves in direction F. The transverse knife 11 creates a pattern of transverse slits 30. The knife 11 moves linearly back and forth, and momentarily retracts downward before reversing direction. In an alternate embodiment, the knife 11 moves past the bag and does not have to retract downward. The brief period of no contact with the bag by knife 11 allows a transverse motion without retraction. FIG. 4 shows the quadrants Q formed on the bottom of bag 16. When the gripper wheels 14, 15 grab the top, leading edge of the bag 7, the bag 16 peels off leaving the contents to fall into the thrasher 19 shown in FIG. 1.

Figure 5:
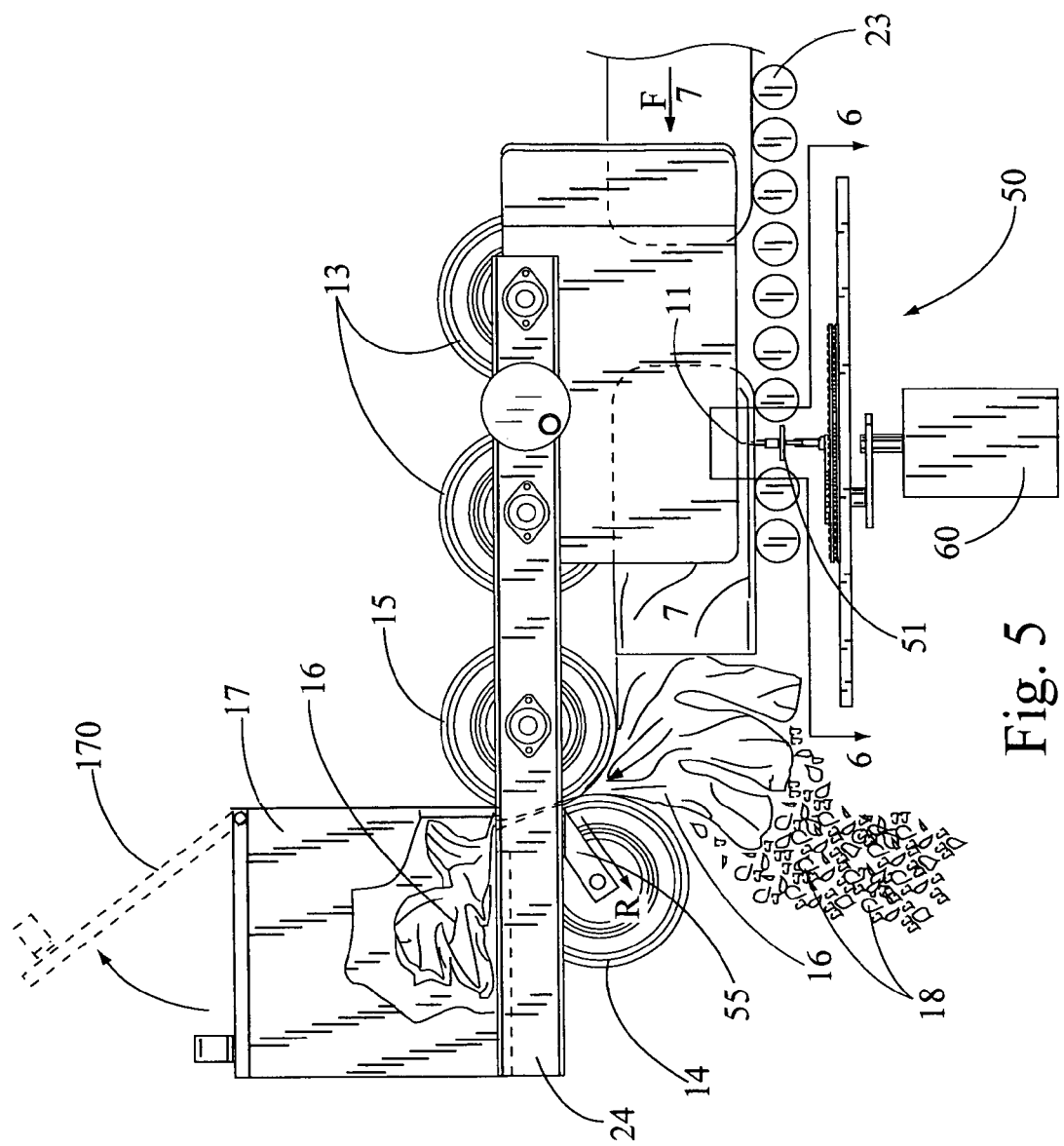
FIG. 5 is a side elevation view of the gripper wheels at work corresponding to area 5-5 of FIG. 2.

Referring next to FIG. 5, each roller 23 is a free roller. The gripper wheels 14, 15 are preferably simple wheelbarrow tires nominally 8-10 inch in diameter. Tire 14 is mounted on a spring loaded strut assembly 55 to allow the tire 14 to move in direction release R when bag parts pass between tires 14, 15. A lid 170 allows removal of bags 16 from bin 17. The knife 11 is mounted on a retracting assembly 51 which traverses the width of each bag in a linear motion. The linear motion in this configuration is supplied by a Cardan gear assembly 50.

Figure 6:
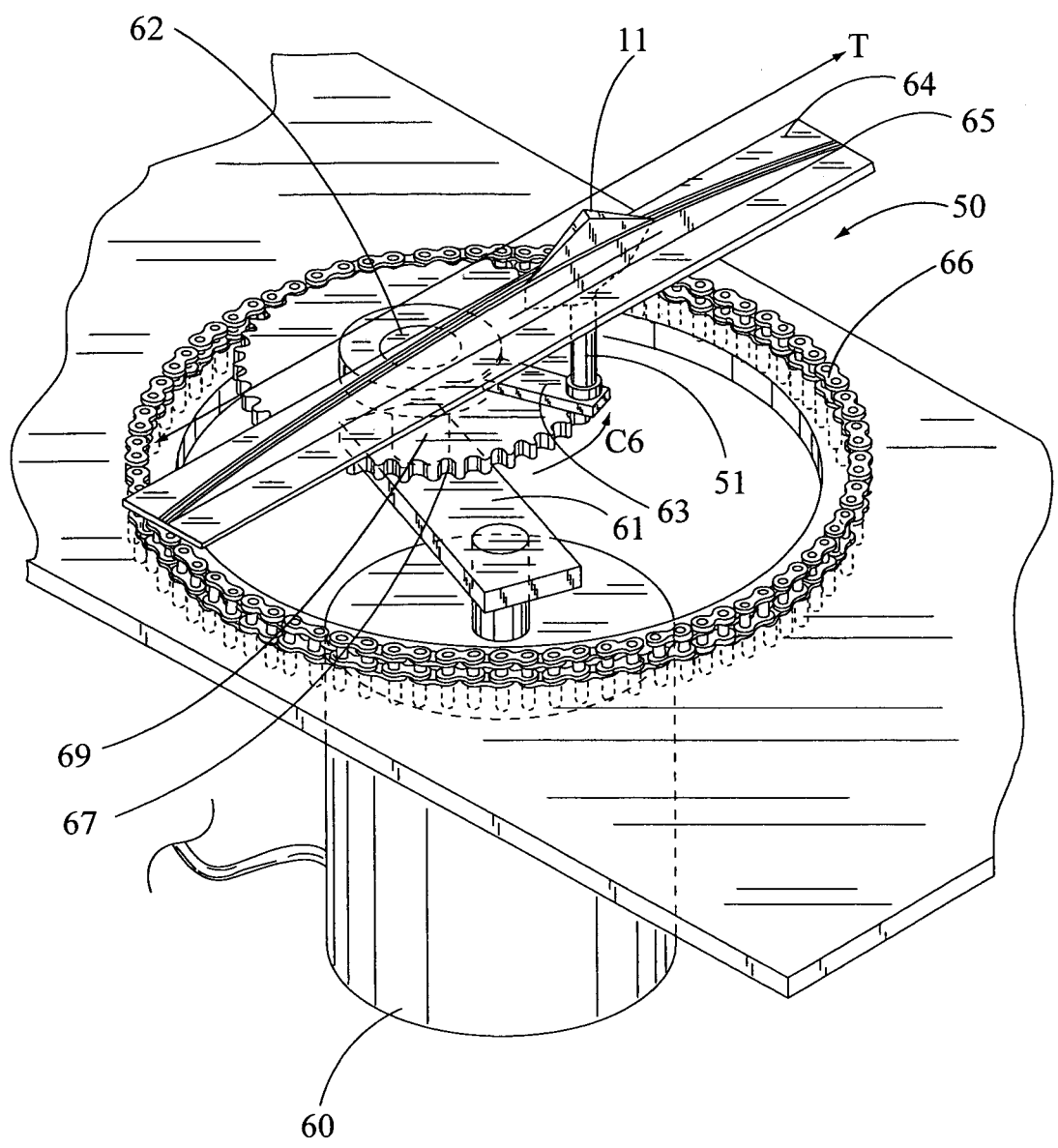
FIG. 6 is a top perspective view of the preferred embodiment Cardan gear transverse slitter taken along direction 6-6 of FIG. 5.

Referring next to FIG. 6, the Cardan gear assembly 50 has its origins in the $16^{th}$ century. Cardan gear assembly 50 transforms rotary motion of motor 60 into reciprocating motion (back and forth linear motion) of knife mount 51.

Motor 60 powers arm 61. Teeth 67 of inner gear 69 interface inner gear 69 with outer chain type gear 66. Pivot point 62 allows inner gear 69 to rotate inside of outer chain type gear 66 in direction C6. Arm 63 and knife mount 51 rotate together with inner gear 69. Knife mount 51 may also retract knife 11. Knife mount 51 travels in linear transverse direction T because the diameter of outer chain type gear 66 is exactly twice as large as the diameter of inner gear 69. A full revolution of arm 61 results in knife mount 51 traveling one complete cycle (back and forth) within slot 65. Knife mount 51 comprises a bearing surface for knife 11. Guides 64 keep knife 11 from spinning. Consequently, solely reciprocating motion of knife mount 51 is transferred to knife 11.

Figure 7:
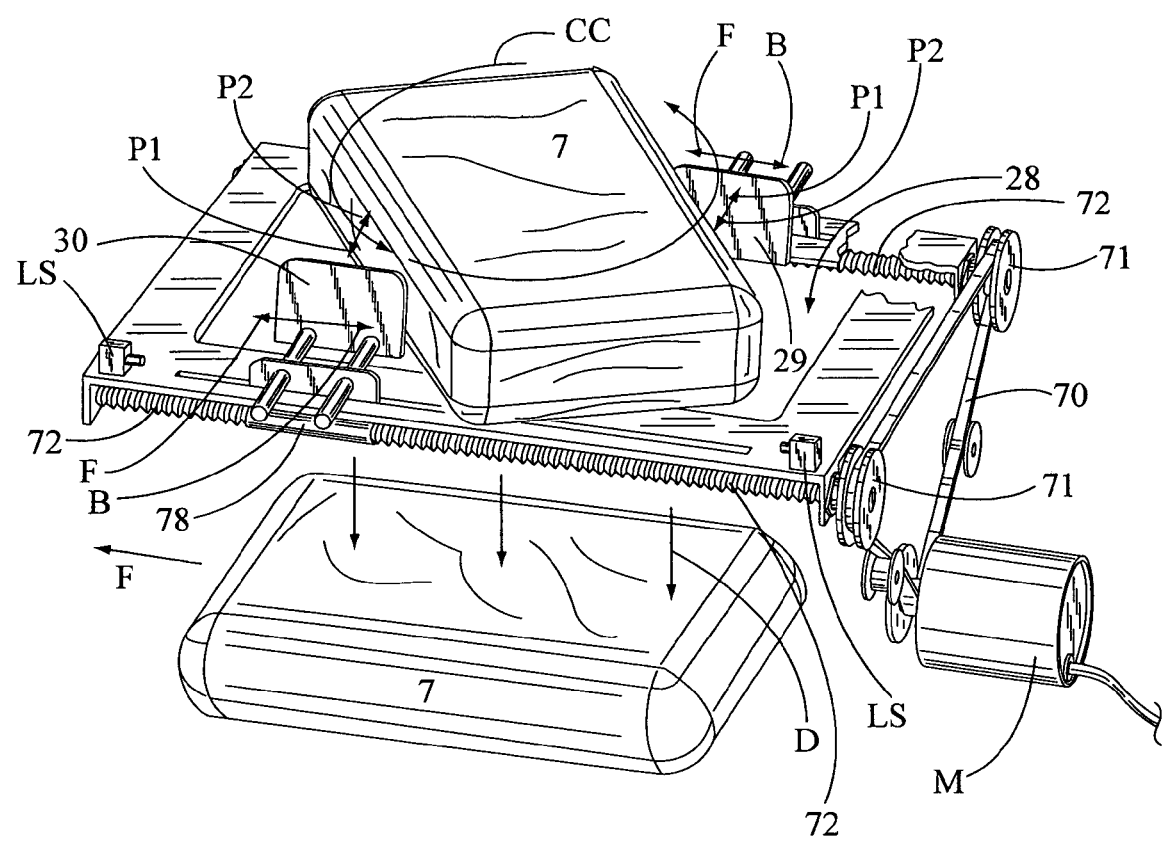
FIG. 7 is a top perspective view of the robot arms of the loader at work rotating a bag corresponding to area 7-7 of FIG. 2.

Referring next to FIG. 7, the bag 7 is being rotated counterclockwise CC by arms 29, 30. Arms 29, 30 move forward F and back B opposite one another. The arms 29, 30 can also move toward one another in direction P2 and away from each other in direction P1 to accommodate different bag sizes. The bag 7 falls in direction down D. Belt 70 turns pulleys 71 to turn worm gears (or left and right hand lead screws) 72 which move the threaded bases 78 of arms 29, 30.

While a number of exemplifying features and embodiments have been discussed above, those of skill in the art will recognize certain modifications, permutations, additions and subcombinations thereof. No limitation with respect to the specific embodiments disclosed herein is intended or should be inferred.

I claim:

1. A system for opening rectangular bags of non-powdered insulation material into a dispensing subsystem, the system comprising:
   a storage subsystem capable of holding one or more rectangular bags of a same first size in a vertical stack;
   a releasing subsystem capable of releasing a rectangular bag located at a bottom of the vertical stack (first bag) from the storage subsystem into a first conveyor subsystem;
   wherein the first conveyor subsystem is capable of transporting the first bag from the storage subsystem to a cutting subsystem;
   the cutting subsystem comprising a longitudinal stationary blade and a moving transverse blade;
   wherein the longitudinal stationary blade cuts one or more longitudinal slits in a bottom of the first bag in a longitudinal direction as the first bag travels through the cutting subsystem;
   wherein the moving transverse blade cuts a plurality of slits in the bottom of the first bag in a transverse direction as the first bag travels through the cutting subsystem;
   the transverse slits intersecting the longitudinal slits;
   a gripping subsystem comprising two gripping wheels capable of separating the first bag from the non-powdered insulation material housed within the first bag after the first bag is cut; and
   wherein the non-powdered insulation material falls from the gripping subsystem into the dispensing subsystem.

2. The system of claim 1, wherein a long side of each rectangular bag of the vertical stack of the storage subsystem is initially oriented in a same first horizontal direction.

3. The system of claim 2, wherein the releasing subsystem further comprises a base to support the one or more rectangular bags of the vertical stack of the storage subsystem.

4. The system of claim 3, wherein the base comprises a rectangular opening of a second size larger than the first size.

5. The system of claim 4, wherein a long side of the rectangular opening is oriented in a horizontal direction other than the first horizontal direction.

6. The system of claim 5, wherein the releasing subsystem further comprises a rotating subsystem capable of rotating the first bag such that the first bag will fall through the rectangular opening.

7. The system of claim 6, wherein the releasing subsystem further comprises a pair of arms to rotate the first bag.

8. The system of claim 1, wherein the cutting subsystem further comprises a plurality of powered wheels capable of contacting a top surface of the first bag.

9. The system of claim 1, wherein the moving transverse blade is driven by a cardan gear subsystem.

10. The system of claim 1, wherein the two gripping wheels rotate in opposite directions.

11. The system of claim 10 further comprising a bin capable of receiving the first bag after the first bag has been separated from the loose material housed within the first bag.

12. The system of claim 1, wherein the dispensing subsystem further comprises a thrasher, a rotary airlock, a blower system, and a discharge hose.

13. The system of claim 1, wherein the storage subsystem further comprises a plurality of guide posts.

14. A system for opening rectangular bags of non-powdered insulation material into a dispensing subsystem means, the system comprising:

a storage subsystem means functioning to hold one or more rectangular bags in a vertical stack;

a releasing subsystem means functioning to release a rectangular bag located at a bottom of the storage subsystem means (first bag) from the storage subsystem means to a conveyor subsystem means;

the conveyor subsystem means functioning to transport the first bag from the storage subsystem means to a cutting subsystem means;

the cutting subsystem means functioning to cut slits forming a plurality of quadrants in a bottom of the first bag;

said cutting subsystem means having a stationary blade means functioning to cut a longitudinal slice along the bottom of the bag and having a powered transverse blade means functioning to cut a plurality of transverse slices on the bottom of the bag;

wherein said transverse slices intersect the longitudinal slice;

a gripping subsystem means functioning to separate the first bag from the loose material housed within the first bag; and the dispensing subsystem means functioning to dispense the non-powdered insulation material in a controlled manner.

15. A process of opening a rectangular bag of non-powdered insulation material into a dispensing subsystem, the process comprising the steps of:

storing one or more rectangular bags in a vertical stack within a storage subsystem;

rotating a rectangular bag located at a bottom of the vertical stack (first bag) such that the first bag falls through a rectangular opening in a base plate;

transporting the first bag from the storage subsystem to a cutting subsystem;

cutting slits in two different directions in a bottom of the first bag via a stationary blade and a moving blade located within the cutting subsystem;

providing said moving blade with a powered transverse motion actuator;

cutting a plurality of transverse slits across at least one longitudinal slit by actuating said moving blade;

separating the first bag from the non-powdered insulation material housed within the first bag by gripping the first bag between two wheels rotating in opposite directions; and receiving the non-powdered insulation material in the dispensing subsystem.

* * * * *